Aug. 11, 1931.    J. J. USHER    1,818,365
WAVE MOTOR
Filed July 28, 1928    2 Sheets-Sheet 2
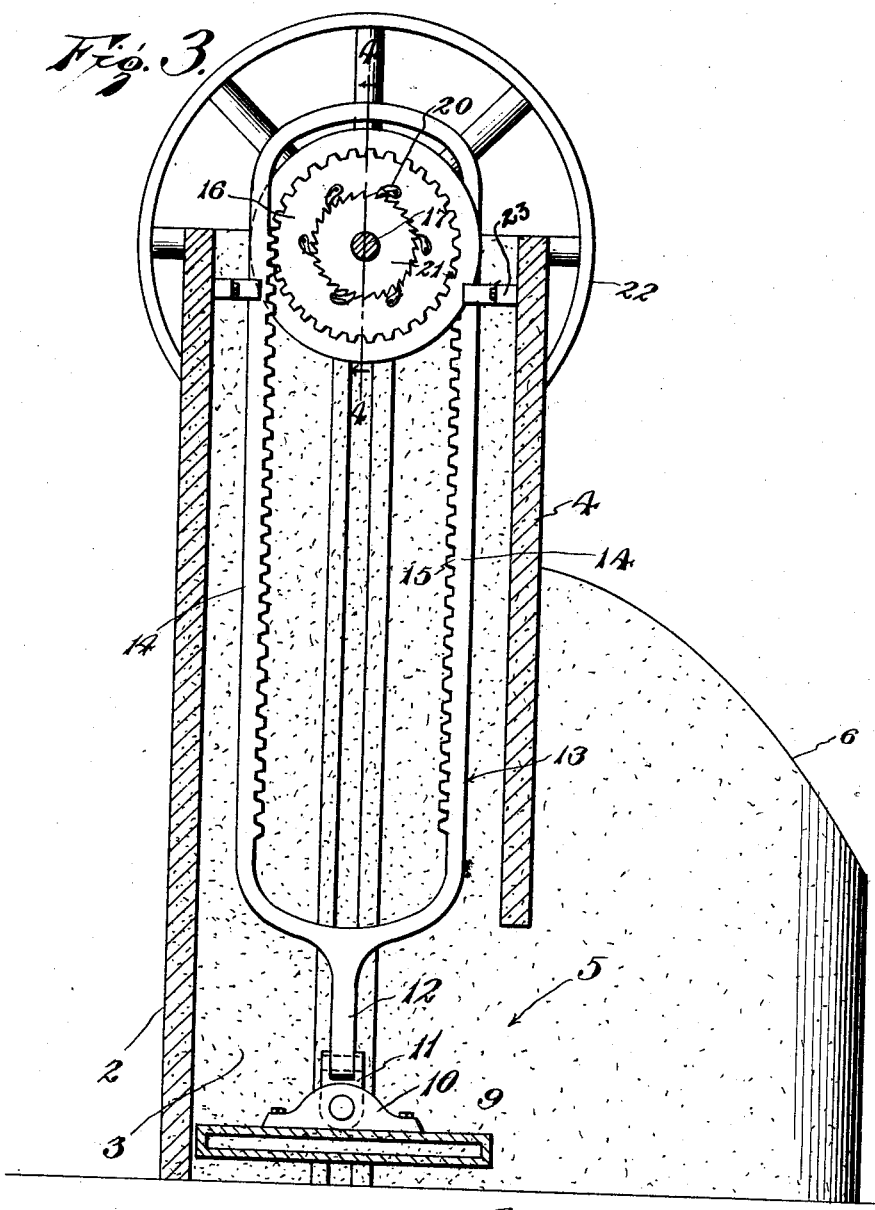
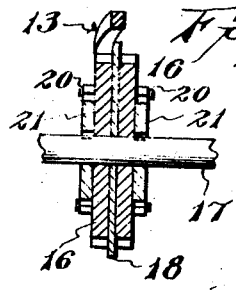
Inventor
J. J. Usher
By Lacey & Lacey, Attorneys Patented Aug. 11, 1931

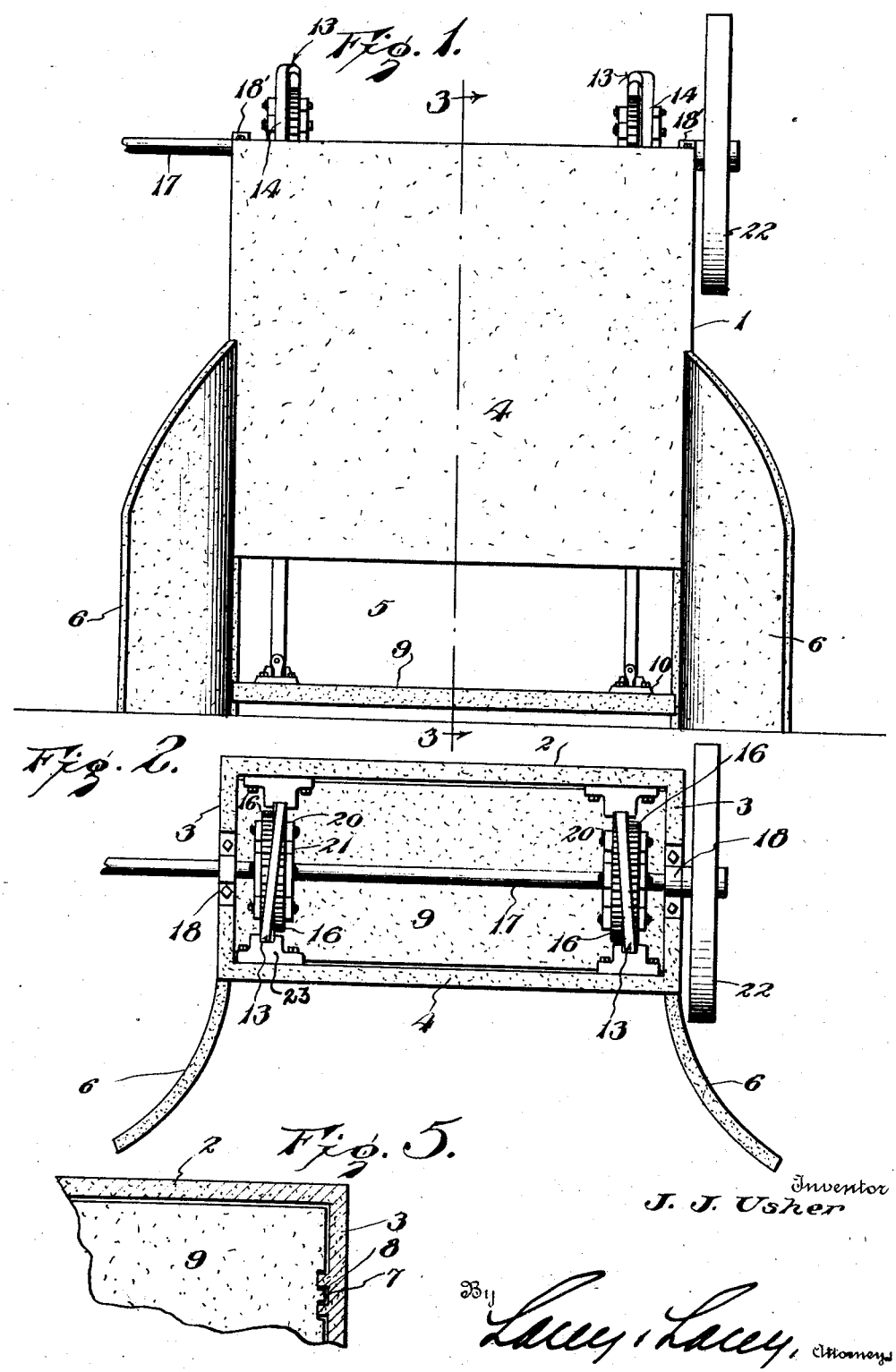

1,818,365

UNITED STATES PATENT OFFICE

JOHN J. USHER, OF ST. HELENS, OREGON

WAVE MOTOR

Application filed July 28, 1928. Serial No. 295,942.

The present invention is directed to improvements in wave motors.

The primary object of the invention is to provide a device of this character so constructed that the operation thereof will be positive and will operate regardless of the height of swells of the waves.

Another object of the invention is to provide a device of this character which can be placed in a position to assure that the same will be subjected to the action of the waves, the construction being such that the waves will be positively directed for actuating the float.

Another object of the invention is to provide a device of this character wherein the float will be of considerable length and is so mounted that when the float is raised or lowered unevenly, the movement thereof will be transmitted to the power gearing.

Another object of the invention is to provide a housing for the working parts of the motor which is formed from cement so that it will last indefinitely.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a front view of the device.

Figure 2 is a top plan view.

Figure 3 is a sectional view on line 3—3 of Figure 1.

Figure 4 is a sectional view on line 4—4 of Figure 3.

Figure 5 is a fragmentary detail perspective view through the housing showing the guide for the float.

The housing 1 comprises a back 2 and sides 3, the front 4 of the housing stopping at a point in a plane above the lower edge of the sides and back in order to provide an entrance 5. The sides have formed as continuations thereof outwardly flared deflectors 6 which extend somewhat above the entrance 5, said deflectors obviously serving to direct the waves into the entrance opening 5.

The ends 3 of the housing are provided with guides 7 and in which are slidable the extensions 8 of the float 9, said float being formed from cement and it will be of course understood that when the housing is formed provision will be made for the float to be elevated above the ocean bed even at the lowest tide in order that the incoming waves will be effective to elevate the float.

The float has secured thereto in any approved manner blocks 10 to which are pivotally mounted links 11, said links having pivotally connected to their upper ends the extensions 12 of the yokes 13. By this construction it will be observed that the float will have a universal connection with the yokes 13 in order that the float can rise and fall when uneven or tilted due to the condition in which the same is subjected to the action of the waves.

The side bars 14 of the yokes are provided with teeth 15, and it will be observed upon reference more particularly to Figures 1 and 2 that the bars 14 are offset in order that they will engage the gears 16, said gears being arranged in pairs and loosely mounted upon the drive shaft 17, said shaft being journaled in boxes 18 supported upon the upper ends of the sides 3 of the housing.

The gears 16 of each pair are maintained in spaced relation by a disk 18 and the outer surfaces of these gears are provided with a plurality of circularly alined spring pressed pawls 20 which are adapted to cooperate with the ratchet wheels 21 which are fixed to the shaft 17 and adjacent the outer faces of the gears 16, as clearly shown in Figure 4 of the drawings.

To one end of the shaft 17 is fixed a flywheel 22, the inertia of which will naturally increase the power of the shaft 17, which may be coupled in any suitable manner to operate any apparatus desired, It will be obvious that as the float 9 rises under the action of the waves one of the bars 14 in its upward movement will rotate the associated gear and thus the ratchet wheel to impart rotary movement to the shaft, the downward movement of the yoke causing the other bar to actuate the companion gear in a similar manner, thus, as the float rises the two yokes will impart a rotary movement to the shaft, and this movement will not be interrupted as the float falls, owing to the arrangement of the gears and ratchet wheels. In this manner a continuous rotation is imparted to the shaft 17 during the rising and falling of the float, and the rotation of the shaft will be continuous regardless of the height to which the float rises.

It will be understood that the housing is formed from cement in order that it will last indefinitely, and mounted in the upper ends thereof are guides 28 for the bars 14.

Owing to the presence of the deflectors 6 it will be obvious that the incoming waves will be directed into the passage 5 so that they will act upon the float 9. Further it will be observed that by providing these deflectors the height of the wave will be increased as it enters the housing, and since the wave enters the housing the height thereof will be twice increased, therefore a wave five feet high from its trough to its crest will have the same effect upon the motor as a wave ten feet high. It will therefore be obvious that even if the float is subjected to a comparatively low wave or ground swell the motor will be actuated.

It will be observed that the float is comparatively shallow and elongated, thereby offering considerable resistance for the waves when running thereunder in order that the float can be properly lifted for reciprocating the yokes 13.

From the foregoing, it is thought the construction, operation and many advantages of the herein described invention will be apparent to those skilled in the art without further description, and it will be understood that various changes in the size, shape, and proportion and minor details of construction may be resorted to without departing from the spirit or sacrificing any of the advantages of the invention.

Having thus described the invention, I claim:

A wave motor comprising a housing open at the top and bottom and including front, back and side walls, the front wall terminating some distance from the lower ends of the back and side walls, and the latter having flared extensions, a float in the housing, guide means between the ends of the float and the side walls, a shaft mounted in bearings at the top of the side walls, pairs of gear wheels loose on opposite end portions of the shaft and connected thereto by reverse ratchet mechanism, a yoke for each pair of gear wheels having a lower extension, and having its bars offset and toothed and in mesh with the respective gear wheels of a pair, guides on the front and back walls of the housing to coact with the bars of the yokes, and links pivotally connecting the extensions of the yokes with the float to provide a universal joint to admit of an unequal movement of the float without binding.

In testimony whereof I affix my signature.

JOHN J. USHER. [L. S.]